(12) United States Patent
Endres

(10) Patent No.: US 7,013,237 B2
(45) Date of Patent: Mar. 14, 2006

(54) APPARATUS AND METHOD FOR MONITORING A RUNNING PROCESS

(75) Inventor: Hanns-Erik Endres, München (DE)

(73) Assignee: Fraunhofer-Gesellschaft zur Förderung der angewandten Forschung e.V., (DE)

( * ) Notice: Subject to any disclaimer, the term of this patent is extended or adjusted under 35 U.S.C. 154(b) by 25 days.

(21) Appl. No.: 10/606,912

(22) Filed: Jun. 26, 2003

(65) Prior Publication Data
US 2004/0059516 A1  Mar. 25, 2004

(30) Foreign Application Priority Data
Jun. 27, 2002 (DE) .................. 102 28 799

(51) Int. Cl.
G06F 11/30 (2006.01)
G06F 17/00 (2006.01)
G05B 19/42 (2006.01)

(52) U.S. Cl. .................. 702/182; 324/207.25; 700/83; 702/85; 702/116

(58) Field of Classification Search ............ 702/81–85, 702/116, 182; 324/633, 637, 639, 207.25; 376/216, 259; 700/108–111, 121, 4.7, 83; 438/14
See application file for complete search history.

(56) References Cited

U.S. PATENT DOCUMENTS

| | | | |
|---|---|---|---|
| 5,568,400 A * | 10/1996 | Stark et al. | 702/85 |
| 5,715,178 A * | 2/1998 | Scarola et al. | 702/116 |
| 5,949,678 A | 9/1999 | Wold et al. | |
| 6,693,423 B1 * | 2/2004 | Weser | 324/207.25 |

FOREIGN PATENT DOCUMENTS

| | | |
|---|---|---|
| DE | 197 43 600 A | 10/1997 |
| DE | 197 55 133 A1 | 12/1997 |
| DE | 101 14 206 A1 | 3/2001 |
| EP | 0 858 017 A2 | 1/1998 |
| EP | 1 288 759 A1 | 5/2001 |
| EP | 1 178 380 B1 | 7/2001 |

* cited by examiner

Primary Examiner—Michael Nghiem
Assistant Examiner—John Le
(74) Attorney, Agent, or Firm—Dougherty / Clements

(57) ABSTRACT

A method for monitoring a process consists of repeatedly acquiring at least two different pieces of information of the process, performing a component transformation using the acquired information to calculate a main component measurement vector in a main component space, calculating a process indicator quantity by using the calculated main component measurement vector with one or several main component measurement vectors of a previous acquisition, and detecting a process end by using the process indicator quantity. Apparatus for monitoring a process is also disclosed.

19 Claims, 6 Drawing Sheets

APPARATUS AND METHOD FOR MONITORING A RUNNING PROCESS

BACKGROUND OF THE INVENTION

1. Field of the Invention

The present invention refers to the monitoring of processes.

2. Description of the Related Art

The growing automatization of processes or procedures of industry or daily life requires checking and control. Thereby, information has to be determined from sensor data, which provide statements about the state of the process and whether the process has already been completed. These statements are determined on the basis of measuring values determined by the sensors based on the process knowledge either by operating staff or by respective algorithms.

In the prior art, a plurality of sensors are usually used, which serve for the evaluation of the process progress, for checking and control of discontinually running processes in liquids, a cleaning step in an industrial plant for food processing for cleaning coatings, etc. If the process progress cannot be measured directly, the sensor data in the control are evaluated whether the process is to be completed or whether a further process step is required.

For the process measurement technology, different sensors are used for measuring respective parameters. These sensors can be conductivity sensors, which, for example, measure conductivity ohmically, via voltammetry or potentiometry. Further, sensors for measuring the optical properties, are used, such as via transmitted light, scattered light, surface reflection measurement or spectroscopy. Further sensors used in the prior art comprise sensors for the acquisition of the viscosity, the permitivity, for example by the acquisition of the impedance or impedance spectroscopy, a temperature, a heat conductivity, a heat capacity or chemical sensors of all types. Thereby, it is normally insignificant whether the sensors are constructed in a conventional way or in a microsystemtechnical way. Further, an integration of the sensors is not critical, as long as the integration position is suitable for the measurement of relative properties.

Apart from the quality of the sensors and the acquisition of the parameters by the sensors, the evaluation of the acquired parameters is of significant importance. Therefore, knowledge-based algorithms, such as a fuzzy logic, are used in the prior art.

However, these methods have a number of disadvantages. On the one hand, it is typically difficult and expensive to determine the connection between the sensor parameters and the state of the process. Disturbance variables, which have not occurred in determining the dependency of the sensor parameters on the state of the process, are difficult to compensate. Generally, knowledge-based algorithms have the disadvantage that they cannot react to unexpected changes. Further, the time changes of the sensor, i.e., a sensor drift, have to be compensated expensively, or a recalibration of the sensor has to be performed.

OBJECT OF THE INVENTION

It is the object of the present invention to provide an apparatus and a method which enable stable monitoring of running processes.

BRIEF SUMMARY OF THE INVENTION

The present invention is a method for monitoring a process with the following steps: repeatedly acquiring at least two different pieces of information of the process; performing a main component transformation due to the acquired information without using information acquired prior to the monitoring method, for calculating a main component-measuring vector in a main component space; calculating a process indicator quantity by using the calculated main component measurement vector and one or several previously calculated main component measurement vectors; and detecting a process end by using the process indicator quantity.

Further, the present invention is an apparatus for monitoring a process, comprising: acquisition means for repeatedly acquiring at least two different pieces of information of the process; means for performing a main component transformation due to the acquired information, whereby a main component measurement vector is calculated in a main component space; and evaluation means for calculating a process indicator quantity by using the calculated main component measurement vector and one or several previously calculated main component measurement vectors, wherein the evaluation means is further formed to detect an end of the process by using the process indicator quantity.

The present invention is based on the knowledge that an end of a discontinuous process is distinguished by the fact that the process parameters do not change any more and are merely influenced by statistical variations or transversal effects. A sensitive observation of this saturation process is achieved by performing a main component analysis, which is calculated from the sensor data in a single-step or multi-step method. Thereby, a trajectory of the measurement vectors, which comprise all sensor signals, will end in a saturation point after the main component transformation. According to the invention, subsequent measurement vectors are compared to one another, respectively, in the, main component space to obtain an indicator quantity. By the iterative comparison of subsequent measurement vectors in the main component space, problems, which result from a time shift due to transversal influences, such as influences of sensor drifts prior to the start of the measurement series in the saturation point of the main component space are eliminated, since not the trajectory as such, but merely a relative change of the measurement vectors in the main component space is observed and used for evaluation. This enables, for example, the elimination of long-time drifts or a zero point shift of the sensor signals caused by a change of the sensor prior to the beginning of the measurement series.

In the comparison of the measurement vectors in the main component space, which are also referred to as main component measurement vectors below, different criteria can be used. In one embodiment, the spacing of two main component measurement vectors subsequent in time, respectively, is used. Thereby, different metrics, such as an Euclidian metric or Mahalanobis distance, are available.

Further, the direction of a difference vector of the main component measurement vectors to be compared, respectively, can serve as another criterion, which is referred to as direction criterion below.

For calculating the main component measurement vectors, it is further possible to use a selection of the measurement vectors, which are used for the main component analysis, such as every second measurement vector. Further, it is possible to perform an averaging of a predetermined number of measurement vectors, so that a main component transformation is performed merely by using the average values.

For calculating the main component transformation, every known algorithm can be used, wherein the Nipals algorithm is preferred, which enables a particularly fast calculation.

In one embodiment, one or several further criteria can be used for generating one or several further indicator quantities. One such criterion, for example, can be the duration by which a final state is achieved. The further indicator quantity can, for example, serve for making a decision whether a further process step is required and of what type this further process step is.

For the decision, whether and which type of intervention in the process is to be performed, a single one of the above described criteria or a combination of the criteria can be performed. In one embodiment, an absolute value and preferably an average absolute value of the spacing criterion and the direction criterion is used to perform a determination, whether a further process step is required.

The measurement data of the measurement vectors can comprise sensor data of one or several known sensors, such as optical, capacitive, amperometric or chemical sensors. Further, the sensor data can also be obtained from a multi-sensor system.

Prior to the main component transformation, the measurement data of the measurement vectors can be subjected to a normalization. Typically, the average value is normalized to 0 and the variance to 1. The normalization can be performed for the data acquired up to the time of the respective main component transformation, or in a set way, which is maintained for all data acquired during the whole process. Which one of the normalizations is used in a process has to be decided from case to case.

The sensor data can be transient sensor signals, such as a spectrum or a temperature. Further, the sensor data can comprise data of a time series measurement.

It is an advantage of the present invention that an a priori knowledge of the process is not required for extracting the main components or features, respectively. Further, due to the successive execution of the main component analysis, no calibrated main component system is required. Further, problems, which can arise through sensor drifts, unexpected transversal influences, etc., when they deviate too far from the original calibration, are avoided by the regular recalculation.

Further, the selection of the sensor technology can be determined either on the basis of the process knowledge or on the basis of formal criteria, such as, for example, an influence on the result, which can be determined from the first sub matrix of the main component transformation (loadings).

Further, in one embodiment, a multi-stage main component transformation, can be used for the combination of sensor data of different dimensional characteristics. In one embodiment, three main components of a spectrum, a conductance, a temperature and an optical absorption are used as measurement vector for the main component transformation.

BRIEF DESCRIPTION OF THE DRAWINGS

These and other objects and features of the present invention will become clear from the following description taken in conjunction with the accompanying drawings, in which.

DETAILED DESCRIPTION

Figure 1:
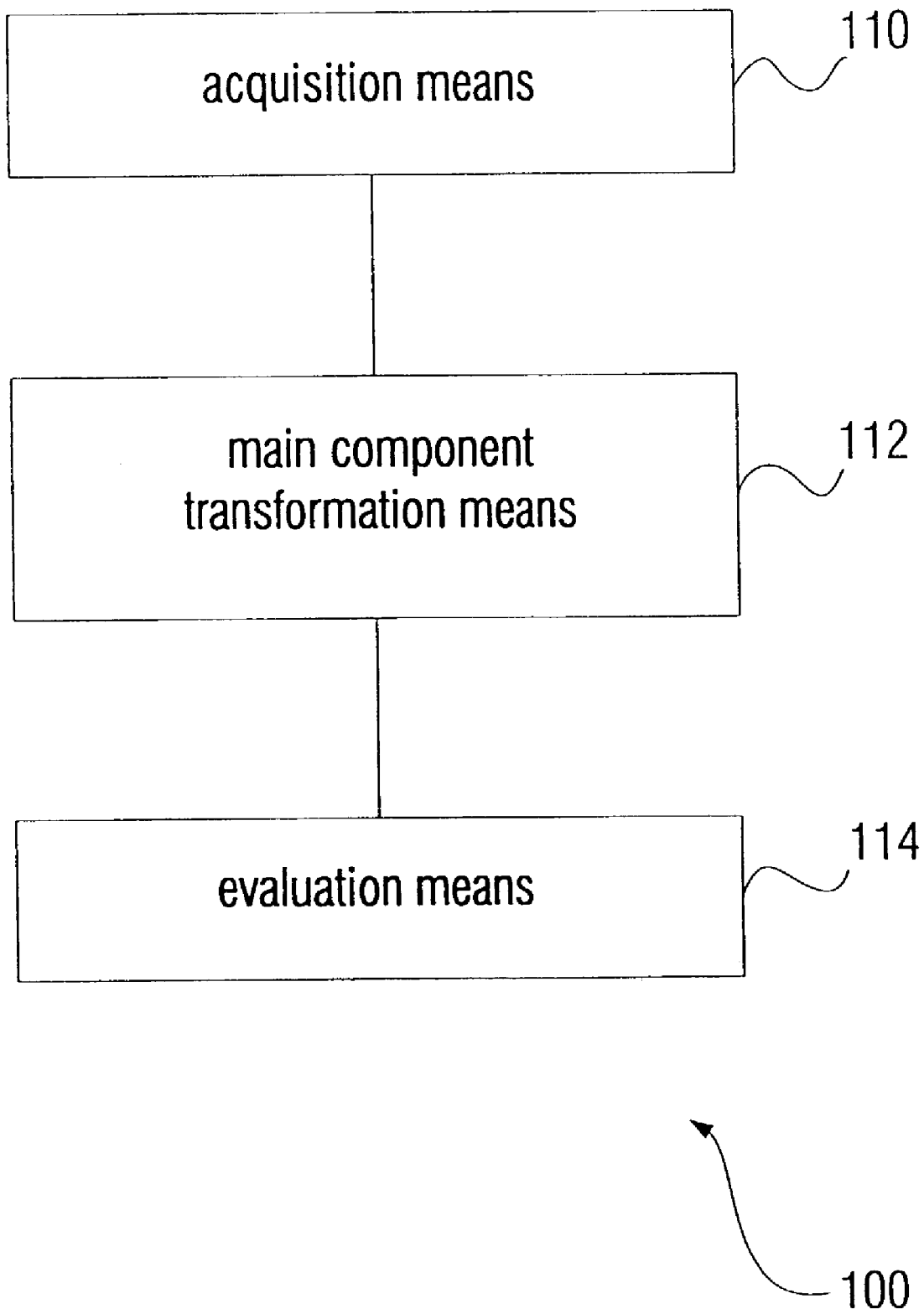
FIG. 1 is a schematic representation of an embodiment of a control apparatus according to the present invention.

FIG. 1 shows an apparatus 100 for monitoring a discontinually running process as one embodiment of the present invention. The apparatus 100 comprises acquisition means 110, which is connected to main component transformation means 112. The acquisition means 110 is performed to provide information of the process, which can be, for example, measurement data, to the main component transformation means 112. The measurement data can be seen as one or several components of a measurement vector, wherein the different components can have different dimensional characteristics. In an impedance spectroscopy for a measurement vector 35, for example, impedance measurement values can be acquired at varying frequencies, wherein in one measurement vector, a logarithmical representation of the measurement values can be chosen as well.

The acquisition means 110 can be a sensor, such as a sensor for measuring conductivities, optical properties, a viscosity, a permitivity, a temperature, a heat conductivity, a heat capacity or chemical properties. Further, the acquisition means 110 can merely comprise an interface or an input to receive measurement signals or measurement data of a sensor.

Further, the main component transformation means 112 is connected to an evaluation means 114. The main component transformation means 112 can, for example, comprise a processor, where appropriate main component transformation methods can be performed, so that a main component measurement vector is generated from the measurement vector in a main component space.

Like the main component transformation means 112, the evaluation means 114 can also comprise a processor, wherein they can share a common processor.

Figure 2:
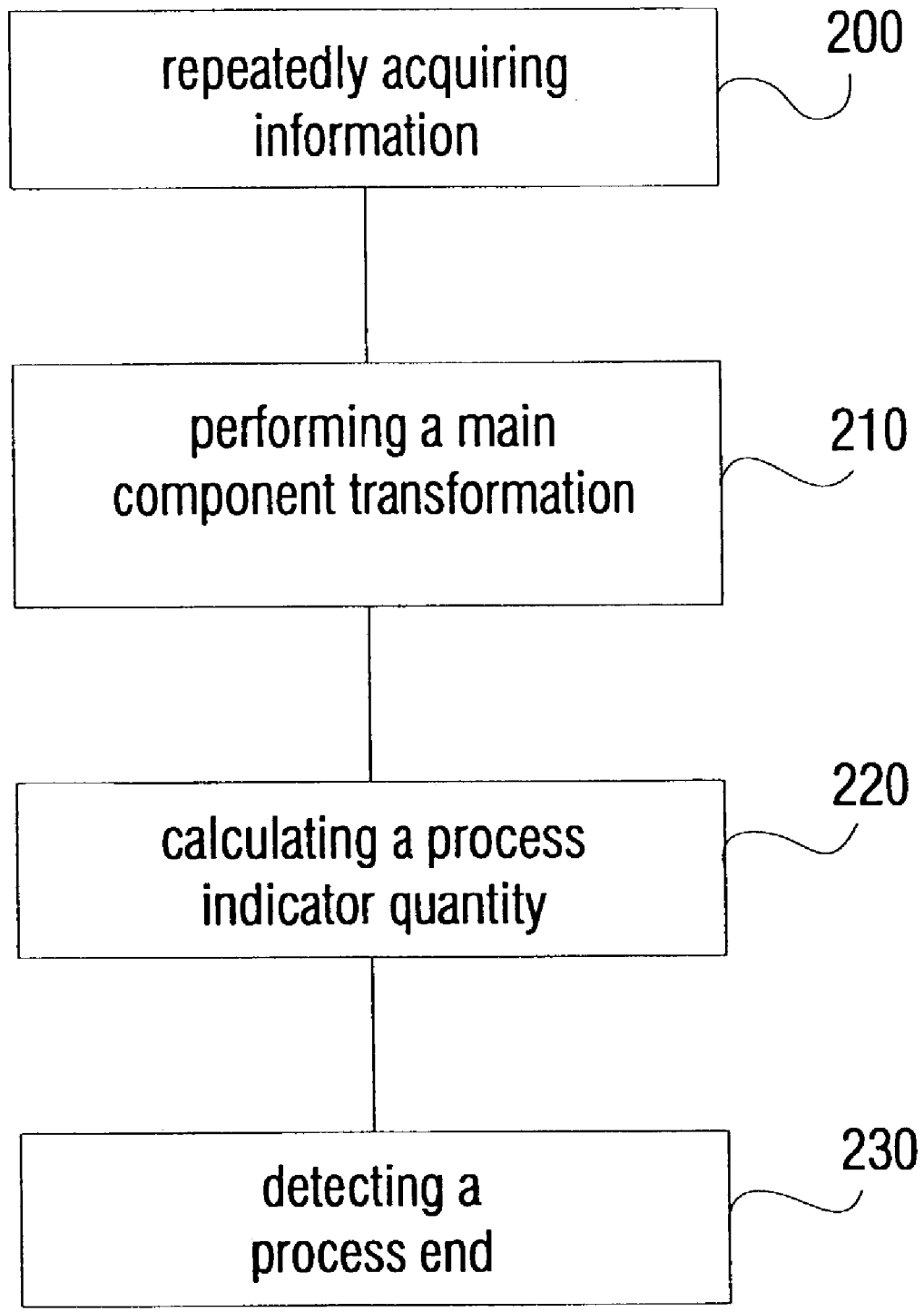
FIG. 2 is a process diagram for illustrating a control flow according to an embodiment of the present invention.

With reference to FIG. 2, the mode of operation of the control apparatus 100 will be discussed exemplarily in more detail below.

In a step 200, an acquisition of measurement data is performed, which acquires preferably all relevant and physical parameters of the process to be monitored. Thereby it has to be considered that a sufficient number of relevant sensors and sensor data, respectively, is available, since the stability of the method depends, among other things, on the relevance and quality of the data. The acquisition of the measurement vectors is performed repeatedly in intervals subsequent in time, which can be chosen depending on process type.

If enough measurement vectors are available, a main component analysis is performed in a step 210. A main component transformation is a mathematical method, where main components and features, respectively, are extracted by using the input data via a multi-variant statistic and the input measurement vectors are transformed to a main component space. Further explanations with regard to fundamentals of the main component transformation can be found, for example, in EP 1 143 240 A1.

The main component analysis provides a suitable means for a monitoring or control method for extracting the features without requiring an a priori knowledge of the process either for the operating staff or implicitly in the used algorithms. Preferably, a Nipals algorithm is used for calculating the main component transformation, which allows a particularly fast calculation.

Preferably, all measurement vectors available up to the calculating time will be used for performing the main component analysis. However, selection of measurement vectors can be made in such a way that, for example, merely the last n measurement vectors are used. Further, a selection can be made in that certain measurement vectors are filtered out for the main component analysis, for example by using merely every second measurement vector. This is particularly advantageous when a reduction of the measurement vectors is to be performed for accelerating the main component transformation. Further, a reduction of the measurement vectors can be achieved via forming average values. As one example, the calculation of a sliding average value is mentioned here.

Preferably, the main component transformation is performed such that a transformation on the eigenvectors is performed merely for the most important main component, wherein the grade of importance depends on the variance of the measurement vectors. The transformation can, for example, be performed only for the first two main components or for the first five main components. Depending on the present case, a selection of the main components used in the main component transformation can be performed, for example by using the first, third and fifth main component.

After performing the main component transformation, the acquired measurement vectors can be represented as respective main component measurement vectors in the main component space.

The main component transformations can also comprise a combination, of sensor signals of different dimensional characteristics. For example, the measurement vectors can consist, respectively, of a spectrum, a conductivity value, a temperature and an optical absorption. In this case, a multi-stage main component transformation can be used, where the main components are calculated from the measurement vector and with components of different dimensional characteristics.

In one embodiment, a pre-processing of the measurement data can take place for the dimensional reduction prior to the main component transformation. Thereby, a Fourier transformation and a wavelet transformation can be used.

Performing the main component transformation takes place in a continuous way, such that after a certain elapsed time or, in other words, after a certain number of newly-acquired measurement vectors, a new main component transformation is performed by using the newly-acquired measurement vectors. The times of respective new main component transformations can be pre-determined or can be determined or changed during the course of the process.

Consequently, by continuously calculating the main component measurement vectors in the main component space, a trajectory results, which represents the time run of the process. Typically, in a discontinuous process, first, a strong alteration of one or several parameters of the process takes place. Here, it should be noted that a discontinuous process means a process where at least one parameter does no longer changes at the end of the process, or merely varies statistically. A discontinuous process can also comprise several sub-processes, which are discontinuous as well.

With regard to the trajectory of the main component measurement vectors in the main component space, this means that it ends in a saturation point and a center, respectively, or merely varies statistically around it. This saturation point can, however, be subject to certain influences, such as influences, which result from a temperature change, whereby its shift is possible.

In order to still be able to perform the control, even with occurring transversal influences and drifts, according to the invention, a comparison of the main component measurement vectors is performed and a process indicator quantity is calculated. Preferably, the last calculated main component measurement vector is compared to the main component measurement vector immediately calculated prior to that, and from them, a process indicator quantity is calculated. Alternatively, several previously calculated main component measurement vectors could also be used for the calculation of the process indicator quantity.

Several criteria are available for the comparison. In the spacing criterion, the spacing of the compared main component measurement vectors, i.e. the quantity of the difference vector, which results from their difference, is determined and used as a process indicator quantity. This can be performed by using different metrics, such as the Euclidian metrics or the Mahalanobis distance. If the process is completed, the respectively calculated spacings of the main component vectors either tend towards zero or towards another final value. As will be explained below, this can be used to make a decision whether and which intervention is to be performed in the process.

Another criterion, the direction criterion, also offers a suitable means for detecting the end of the process. In the direction criterion, the direction of the respective difference vector of the main component measurement vector is calculated as a process indicator quantity. In one embodiment, a combination of the two criteria can be performed. This can, for example, take place by forming an average absolute value. Here, it should be noted that the above-mentioned criteria merely represent a selection, which can serve for the calculation of a process indicator quantity in the comparison of the main component measurement vectors.

The main component analysis can be performed at selected calibration processes, so that the main component transformation calculated at this calibration can be used for the evaluation. Due to the successive performance of the main component analysis, however, such a calibrated main component system is not necessarily required.

Also, further criteria can be derived, such as from the duration until a final state is achieved, whether a further process step is necessary, and if yes, which. In this case, the process indicator quantity can comprise several components, wherein a first quantity is relevant, for example, for the decision whether a further process step is to be performed, while a second component of the process indicator quantity is relevant for the selection of the process step to be performed.

After the process indicator quantity is calculated in step 220, a detection of an end of the process is performed in step 230 by using the process indicator quantity. The detection can, for example, be such that it is determined whether a predetermined number of process indicator quantities are within the predetermined indicator area. Further, a difference method can be used here as well, where successive process indicator quantities are compared to one another to determine a relative change of the process indicator quantities.

Thereupon, in one embodiment for controlling the process, a decision can be made whether an intervention in the process is to be performed. Such a decision process can, for example, be such that the intervention is performed when a predetermined number of process indicator quantities are in a predetermined indicator area.

For illustrating the method explained with reference to FIG. 2, an exemplary illustration of the course of the trajectory in the main component space and a process indicator quantity is explained below with reference to FIGS. 3 and 4.

Figure 3:
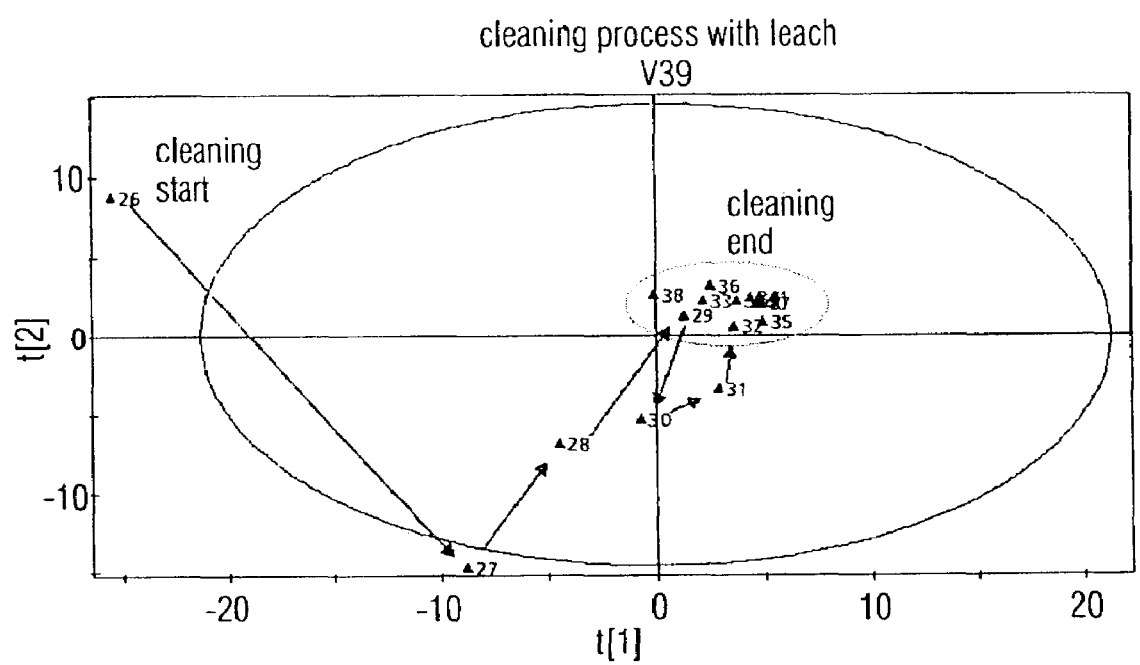
FIG. 3 is a representation of a trajectory, which is projected into the plane of the first two main components of the main component space.

FIG. 3 shows a course of indicator quantities in a diagram, where a first main component is plotted on an x-axis, while a second main component is plotted on a y-axis. Thereby, the illustrated course shows the projection of a trajectory of a main component measurement vector to the plane of these first two main components.

As can be seen, the trajectory begins at a point 26 and moves across a point 27, 28 etc. in an area referenced by with reference number 300, which is not left any more for point 32 and all subsequent ones. Thus, remaining in the area 300 shows the end of the cleaning.

Figure 4:
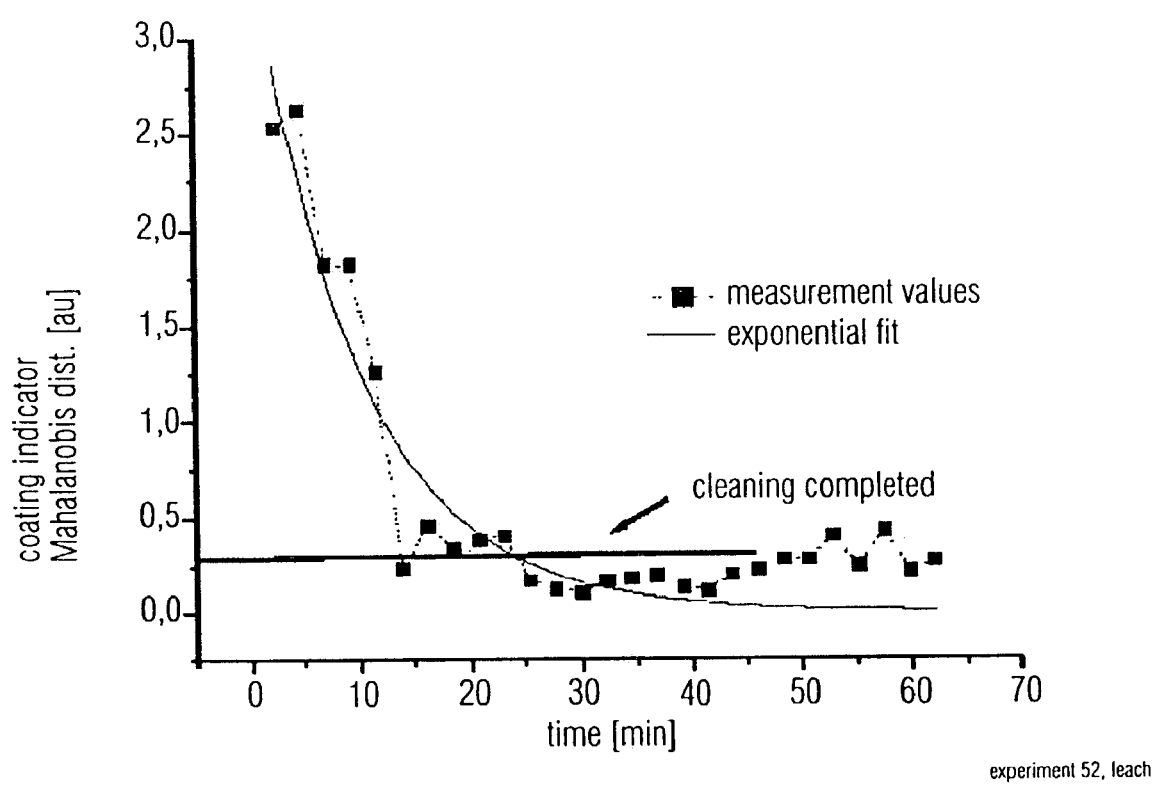
FIG. 4 is a diagram, where an exemplary course of a calculated indicator quantity is plotted against the time.

With reference to FIG. 4, a diagram will be explained below, which illustrates the time run of the calculated process indicator. In the diagram, the time is plotted in minutes on an x-axis, while the process indicator quantity is illustrated in units of the Mahalanobis distance (arbitrary units) on a y-axis.

The process illustrated in FIGS. 3 and 4 is a cleaning process with bleach, where the change of the coating is to be detected by the inventive method, and the cleaning is to be controlled correspondingly, as will be explained below in more detail.

Accordingly, the process indicator quantity plotted in the diagram of FIG. 4 can be seen as coating indicator. In this example, the process indicator quantity has been calculated by a Mahalanobis distance of two subsequent measurement vectors. In the diagram, a threshold value is referenced by a reference number 400, which is used for a decision with regard to performing a process intervention. Permanently remaining under this threshold value indicates that the cleaning has been completed.

Accordingly, by determining a permanent remaining below the threshold value, such as by a predetermined number of points remaining below the threshold value, the process end can be, detected, whereupon suitable control measures are performed for intervening in the cleaning process.

In the following, as one embodiment, the setup for controlling a cleaning process in a tube is described, where the data illustrated in FIGS. 3 and 4 were acquired.

Figure 5:
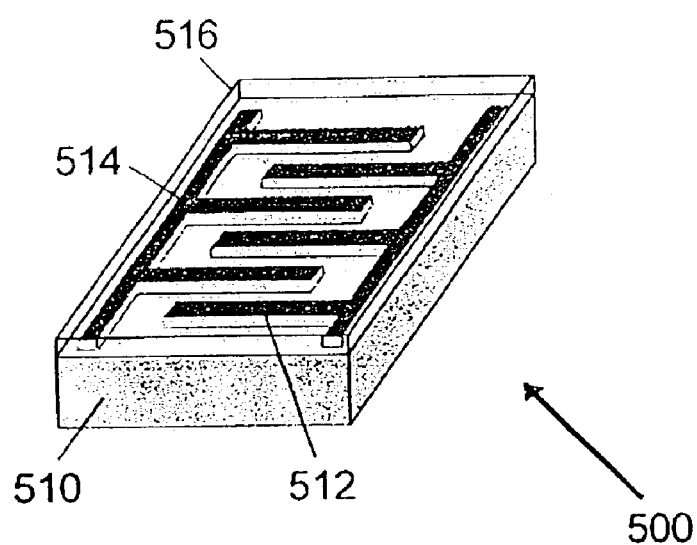
FIG. 5 is a schematic representation of an interdigital capacitor sensor for the detection of coatings, which can be used as a sensor for providing data for performing a monitoring of a cleaning process.

FIG. 5 shows a sensor, which comprises, in this embodiment, an interdigital capacitor, whose impedance depends on a coating deposited thereon. An impedance spectroscopy is used, which makes it possible to acquire a sensor signal. The interdigital capacitor 500 has a known setup, where a dielectric substrate 510 has a first comb electrode arrangement 512 and a second comb electrode arrangement 514. Further, the interdigital capacitor comprises a protective layer 516 of SiC, which provides a chemical and mechanical protection for the sensor. On its outside, the protective layer 516 defines the active area of the sensor.

Figure 6:
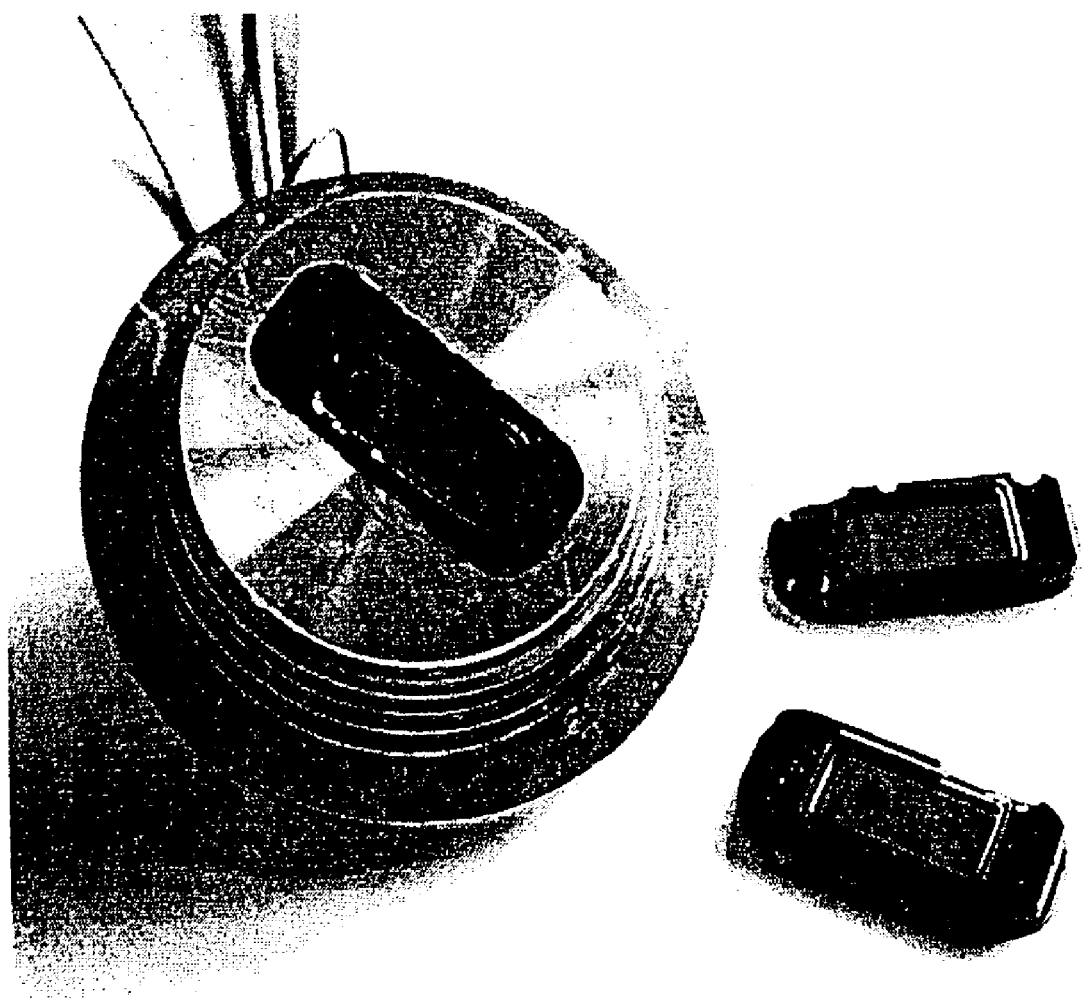
FIG. 6 is a representation of an integration of a sensor for a detection of coatings in a plant.

Further, FIG. 6 shows how the sensor described in FIG. 5 can be inserted into an adaptor plate to detect the coating in the tube and to perform a corresponding control of the cleaning process.

What is claimed is:

1. Method for monitoring a process, comprising:
   repeatedly acquiring at least two different pieces of information of the process;
   performing a main component transformation due to the acquired information without using information acquired prior to the monitoring method, for calculating a main component measurement vector in a main component space;
   calculating a process indicator quantity by using the calculated main component measurement vector and one or several previously calculated main component measurement vectors; and
   detecting an end of the process by using the process indicator quantity.

2. Method according to claim 1, where the process is a discontinually running process.

3. Method according to claim 1, where the step of repeatedly acquiring comprises acquiring of at least two different measurement data of the process.

4. Method according to claim 1, where the step of performing a main component transformation further comprises the step of selecting the acquired information to perform a main component transformation merely for the selected information.

5. Method according to claim 1, where the step of performing a main component transformation further comprises averaging the acquired information for generating average value information, which is used in the main component transformation.

6. Method according to claim 1, where the step of calculating a process indicator quantity comprises calculating the quantity and/or direction of a difference vector, which is formed from the calculated main component measurement vector and a previous main component measurement vector.

7. Method according to claim 1, where in the step of detecting an end of the process, the end of the process is indicated when a predetermined number of process indicator quantities are in a predetermined indicator area.

8. Method according to claim 1, further comprising the step of intervening into a running process when an end of the running process is detected in the step of detecting a process end.

9. Apparatus for monitoring a running process, comprising:
   acquisition means for repeatedly acquiring at least two different pieces of information of the process;
   means for performing a main component transformation due to the acquired information, whereby a main component measurement vector is calculated in a main component space; and
   evaluation means for calculating a process indicator quantity by using the calculated main component measurement vector and one or several previously calculated main component measurement vectors, wherein the evaluation means is further formed to detect an end of the process by using the process indicator quantity.

10. Apparatus according to claim 9, where the acquisition means comprises one or several sensors, which are selected from the group comprising an optical sensor, a capacitive sensor, an amperometrical sensor, a temperature sensor and a chemical sensor.

11. Apparatus according to claim 9, where the means for performing a main component transformation is further formed to make a selection from the acquired information of the process, so that a main component transformation is performed merely for the selected information of the process.

12. Apparatus according to claim 9, where the means for performing a main component transformation is further formed to perform a main component transformation by using average value information, which is formed by averaging the acquired information of the process.

13. Apparatus according to claim 9, where the evaluation means is formed to calculate the process indicator quantity by using a spacing of the calculated main component measurement vector from a previous main component measurement vector and/or a direction of the difference vector from the calculated vector and a previous vector.

14. Apparatus according to claim 13, where the process indicator quantity is calculated from the absolute values of the spacing and the direction of the difference vector.

15. Apparatus according to claim 9, where the acquisition means is formed to acquire transient measurement signals.

16. Apparatus according to claim 15, where the transient measurement signals comprise a spectrum or a temperature signal.

17. Apparatus according to claim 9, where the acquisition means is formed to acquire time series information.

18. Apparatus according to claim 9, where the acquisition means is formed to acquire at least two different parameters of different dimensional characteristics, and wherein the means for performing a main component transformation is performed to perform a multi-stage main component transformation due to the at least two different parameters of different dimensional characteristics.

19. Apparatus according to claim 9, which further comprises a control means to intervene in the running process when an end of the process is detected by the evaluation means.

* * * * *